Patented Aug. 7, 1951

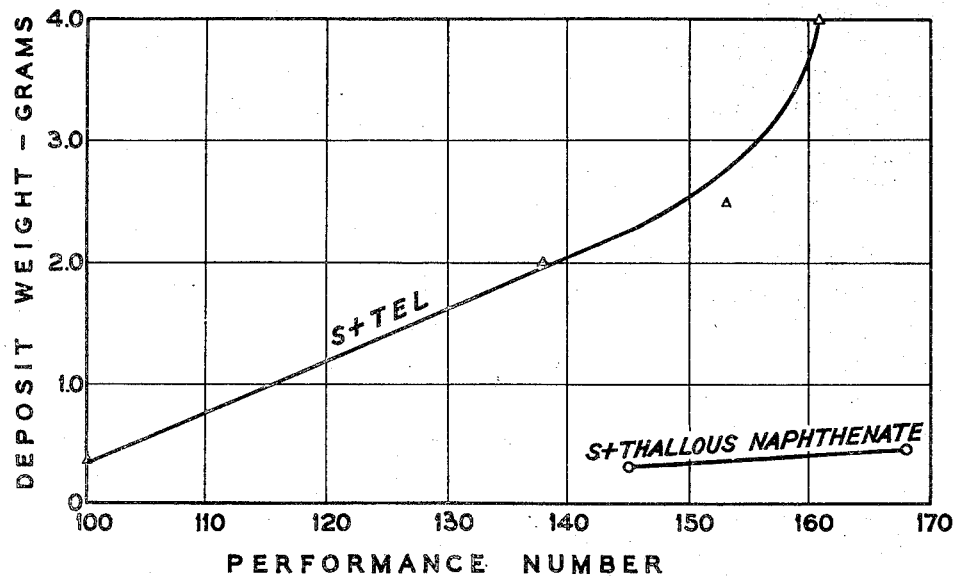

2,562,885

UNITED STATES PATENT OFFICE 2,562,885

THALLOUS COMPOUNDS AS RICH MIXTURE FUEL ADDITIVES

Maurice R. Barusch, Richmond, and George H. Denison, Jr., San Rafael, Calif., assignors to California Research Corporation, San Francisco, Calif., a corporation of Delaware Application November 3, 1947, Serial No. 783,838

4 Claims. (Cl. 44—68)

This invention relates to spark ignition engine fuels; more particularly, to spark ignition engine fuels boiling in the gasoline boiling range and having improved antiknock characteristics under rich mixture conditions and to a method for preparing such fuels.

In an attempt to reach a higher level of power output of a gasoline engine before knocking occurs, it has become the practice to supercharge the engine. However, supercharging, as a means of increasing the power output before knocking, is limited, in that a given fuel can tolerate just so much supercharging, beyond which, excessive knocking occurs. By employing rich fuel-air mixtures, that is, a ratio of fuel to air greater than that required for complete combustion, a greater amount of supercharging can be tolerated, with a given fuel, than if a lean mixture is employed. But this expedient also has the limitations, in that when a certain richness is reached, the engine misfires and the power output drops off.

In an effort to increase the power output still further before knocking occurred, numerous antiknock agents have been added to the base fuel. Among such antiknock agents have been metal carbonyls (e. g., iron pentacarbonyl) and tetraethyl lead. Such other agents as have been prepared are, for the most part, less effective than tetraethyl lead or are more expensive. Despite the advantages of tetraethyl lead, its use is disadvantageous owing to several factors, such as its toxicity and its tendency to deposit lead compounds in carburetors, manifolds, valves, cylinders or exhaust pipes.

A further method of trying to solve the problem of knocking has been the manufacture of special base fuels by cracking, by isomerization of straight to branched chain hydrocarbons and by alkylation of isoparaffins with olefins. Judicious blending of stocks so prepared with one another and/or with straight run distillates has also contributed to upgrading base fuels.

Even by combining the advantages of tetraethyl lead, superior base stocks, supercharging and rich mixtures, it is difficult to meet certain aviation power requirements, such as is necessary in take-off of heavily loaded aircraft. Also, the above noted disadvantages inherent in the use of tetraethyl lead remain.

Fuels of the gasoline type have been rated heretofore generally by the CFR–ASTM–D357–43T Method and the CFR–ASTM–D614–43T Method, hereinafter designated as the "F–2" method and the "F–3" method, respectively. These methods have rated fuels dependably for lean mixture use; i. e., use under normal or cruising conditions, but they are not dependable for rating fuels for use in supercharged engines using rich mixtures, as in aircraft take-off and climbing. Under these latter conditions, many fuels that have been rated as 100 octane or better by the F–2 method and the F–3 method have proved to be inferior fuels under conditions of extreme power requirements where the engine is supercharged and a rich fuel-air mixture is used. Fuels are rated under rich mixture conditions by the CFR–AFD–F4–443 Method (hereinafter called the F–4 Method). This method is described in a report by the Coordinating Research Council dated April 20, 1943, and entitled "CFR Supercharge Method of Test for Knock Characteristics of Aviation Fuels." This method, the description of which has been widely circulated and which is widely used, rates a fuel under conditions of supercharging and rich fuel-air mixtures, and it correlates well with full scale ratings of fuels, as in aircraft take-off and climbing. The engine employed is a single cylinder, liquid cooled, gasoline spark ignition engine; the cylinder is the same as that used in the F–2 method of rating fuels. Manifold fuel injection is employed; the engine is equipped for supercharge; the compression ratio is 7:1, and the engine is operated at 1800 R. P. M., 375° F. jacket temperature, 225° F. air temperature and 45° spark advance BTC. Further details as to design and operation can be attained from the above mentioned report.

Ratings by the F–4 method are given herein in terms of octane number up to 100 octane and, above 100 octane, they are given as performance numbers and as equivalents of iso-octane plus $n$-milliliters of tetraethyl lead per gallon of fuel, $n$ being a positive number usually of the order of 1 to 10. For convenience hereinafter, F–4 ratings will be referred to as so many octane units (e. g., 98 octane units) where the fuel rated is not more than the equivalent of pure iso-octane (which has an octane number of 100); and, where the fuel rated is more than the equivalent of pure iso-octane, as so many performance numbers, and as $S+n$ (e. g., $S+1.0$) where S stands for S-reference fuel, which is iso-octane (2,2,4-trimethyl pentane) and $n$ for the number of milliliters of tetraethyl lead required to be added to iso-octane to produce a fuel having the same F–4 value as the fuel rated. (The number of milliliters of tetraethyl lead, $n$ means $n$-milliliters of the compound $Pb(C_2H_5)_4$).

The performance number is used to designate the relative knock limited power output of fuels having octane numbers above 100 when tested according to the F–4 procedure. Pure iso-octane has an octane number of 100 and a performance number of 100. A fuel having a performance number of 150, for example, has a knock limited power output equal to 1.5 times that of a fuel having a performance number of 100 (e. g., pure iso-octane).

It is an object of the present invention to provide antiknock agents for spark ignition engine fuels and to provide fuels containing antiknock agents, which agents lack the disadvantages of tetraethyl lead.

It is a particular object of the present invention to provide a method of obtaining, and to provide aviation fuels having superior rich mixture ratings, without entirely relying upon the selection of base fuel and the use of large amounts of tetraethyl lead.

It is a further particular object of the invention to provide a gasoline type of fuel for aircraft engines which provides improved antiknock characteristics under conditions of supercharging and of rich fuel-air mixtures.

It is a further object of this invention to provide unleaded aviation fuels having high antiknock and especially high F-4 ratings.

Other and further important objects of this invention may be noted from the specification and claims presented hereinbelow.

It has been discovered that organo thallium compounds in which the thallium is in a monoelectrovalent state improve the rich mixture antiknock ratings of spark ignition engine fuels. Thus, the rich mixture antiknock ratings of spark ignition engine fuels may be improved by an admixture therein of organo monoelectrovalent thallium compounds.

The organo monoelectrovalent thallium compounds may be used in any hydrocarbon fuel boiling in the gasoline boiling range, that is, having an initial boiling point of about 100° F. and a final boiling point of about 400° F. (ASTM, D-86 distillation). Preferably, however, a petroleum base fuel is employed which may be a synthetic petroleum (e. g., petroleum distillate from the Fischer-Tropsch process, etc.), straight run petroleum distillates, fuels prepared by thermal and/or catalytic cracking, an alkylate (e. g., sulfuric acid or HF isoparaffin-olefin alkylate), aromatic fuels, olefinic fuels, naphthenic fuels and blends of two or more of the above and other types of fuels.

Until recently, it was the practice to evaluate the antiknock value of spark ignition engine fuels under lean mixture conditions only. However, as noted hereinabove, it has become necessary to develop fuels having high rich mixture antiknock values; i. e., high F-4 ratings. Previous methods used for increasing the rich mixture antiknock values of base fuels having octane numbers above 100 have not been desirable economically because of the great amounts of required additive. However, it is a peculiarity of monoelectrovalent thallium compounds (i. e., thallous compounds) that only small amounts are necessary for increasing the F-4 octane ratings (i. e., the performance numbers) when the base fuels have a minimum F-4 octane number of 100 (i. e., a performance number of 100). Although the monoelectrovalent thallium compounds are especially effective for improving the rich mixture ratings (the F-4 rating) of base fuels having minimum F-4 octane ratings of 100, the monoelectrovalent thallium compounds are also effective when added to base fuels having F-2 octane number ratings as low as 85; i. e., lean mixture octane number ratings as low as 85. However, this does not mean that the thallium compounds of this invention are effective in improving the F-2 ratings of spark ignition engine fuels when used at the concentrations noted hereinbelow. It does mean that the F-4 rating of a spark ignition engine fuel having an F-2 rating as low as 85 will be improved when that fuel is used in a spark ignition engine operating at rich fuel-air mixture.

The monoelectrovalent compounds of this invention may be represented by the following formula:

$$X^- M^+$$

wherein M is the metal thallium in the monoelectrovalent state and X represents an organic anion. Examples of X anions are the following: the carboxyl anion

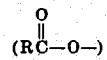

of thallous carboxylates (e. g., thallous oleate, thallous stearate, thallous benzoate, thallous methyl benzoate, thallous phenyl acetate, thallous naphthenate, etc.), the alcoholate anion and phenate anion (RO−) of the thallous alcoholates and the thallous phenates (e. g., thallous ethylate, thallous cetylate, thallous phenate, thallous cresylate, etc.), and the amino anion (RNH−) (RR₁N−) of the thallous amides (e. g., thallous diethylamide, thallous dicetyl amide, thallous dicresyl amide and thallous diphenyl amide). In these formulas, R and R₁ represent saturated and unsaturated aliphatic radicals, aromatic radicals, aralkyl radicals, alkaryl radicals or combinations of these radicals. The R and R₁ radicals may contain, as substituents, polar groups such as chlorine, bromine, hydroxyl, ether, keto, mercapto, etc. The R and R₁ may or may not be the same.

As noted hereinabove, the thallium cation of an organo thallium compound of this invention has a valence of one. When an organo thallium compound wherein the thallium has a valence of zero is added to a fuel as a rich-mixture additive, the F-4 rating of the blended fuel is less than that obtained when using a thallium compound wherein the thallium has a valence of one. For example, when 0.05% of thallium triethyl (wherein the valence of thallium is zero) was added to an S-reference base fuel having an octane number of 100, the F-4 rating of the blended fuel was equivalent to that of the S-reference fuel plus 1.0 ml. of TEL per gallon of fuel. However, when 0.05% of thallium naphthenate (wherein the valence of thallium is one) was added to an S-reference base fuel having an octane number of 100, the F-4 rating of the blended fuel was equivalent to that of the S-reference fuel plus 2.8 ml. of TEL per gallon of fuel. These results are contrary to expectations. Previous results showed that a metal organo compound wherein the metal was in a zero valence state was more effective as a rich-mixture additive than was a metal organo compound wherein the same metal was in a valence state of +1, +2, etc. For example, when 0.05% of tetraethyl lead (wherein the valence of lead is zero) was added to an S-reference fuel having an octane number of 100, the F-4 rating of the blended fuel was equivalent to that obtained with the S-reference fuel plus 1.0 ml. of TEL per gallon of fuel. On the other hand, when 1.0% of plumbous naphthenate (wherein the valence of the lead is +2) was added to an S-reference fuel having an octane number of 100, there was no increase in the F-4 rating.

The thallous compounds of this invention are ineffective to improve the antiknock value or the octane number under lean fuel-air mixture conditions when used within the amounts specified hereinbelow. However, the thallous compounds of this invention are highly effective as additives for spark ignition engine fuels operating at rich mixture conditions; i. e., a fuel-air mixture rich in fuel. It is a desire of this invention that these thallous compounds be used in amounts such that 0.0008% to 0.013% of monoelectrovalent thallium, based on the total fuel, is present in the prepared spark ignition engine fuel.

The following examples show the methods used in preparing some of the organo monoelectrovalent thallium compounds.

EXAMPLE I.—PREPARATION OF THALLOUS ETHYLATE 70 grams of thallium shavings were placed in 500 ml. of absolute ethanol. This mix was heated at reflux temperatures for 6 days, while at the same time air was bubbled through the heated mix. The alcohol was kept at constant volume by adding fresh alcohol to replace that which evaporated. The final alcohol solution of thallous ethylate had a thallium content of 0.0483 gram of thallium metal per ml. of solution. This solution was used further in the preparation of additional thallium compounds.

EXAMPLE II.—PREPARATION OF THALLOUS OLEATE 7.82 ml. of thallous ethylate solution of Example I was mixed with 0.522 gram of oleic acid to form thallous oleate.

EXAMPLE III.—PREPARATION OF THALLIUM CETYL PHENATE 7.82 ml. of the thallous ethylate solution of Example I was mixed with 0.581 gram of cetyl phenol to form thallous cetyl phenate.

EXAMPLE IV.—PREPARATION OF THALLOUS HEPTADECYLATE 8.2 ml. of an alcohol solution of thallous ethylate containing 0.055 gram of thallium metal per ml. was reacted with 5.0 ml. of 3,9-diethyltridecanol-6. The resulting solution was blown with nitrogen for 1 hour to remove the alcohol, thus leaving a solution of thallous heptadecylate in 3,9-diethyltridecanol-6.

EXAMPLE V.—PREPARATION OF THALLOUS NAPHTHENATE

A solution of naphthenic acid in 50% ethyl alcohol was neutralized with 10% caustic. While this alcohol solution was being stirred rapidly, a 15% solution of thallous acetate was added dropwise. Equivalent quantities of naphthenic acid and thallous acetate were used. At the completion of the reaction, the soap was extracted with petroleum ether and the solvent removed by blowing with nitrogen at 200° F. The thallous naphthenate had the following properties:

| Properties | Found | Calculated |
| --- | --- | --- |
| Per Cent Thallium | 42.7, 43.0 | 45.7 |
| Equivalent Weight | 450 | 446 |
| Pour Point (micro) | 45° F | |
| Solubility in Petroleum Ether | >10% | |
| Appearance | Viscous Liquid | |

The following Table I presents data showing that thallous compounds (e. g., thallous naphthenate) are ineffective within the concentrations pertinent to this invention when the fuels are used in spark ignition engines operating at lean fuel-air ratio.

Table I

| Concentrations of Monoelectrovalent Thallium Grams/100 ml. of fuel | F-1 Rating | | F-2 Rating | |
| --- | --- | --- | --- | --- |
| | Octane No. | Octane No. Improvement | Octane No. | Octane No. Improvement |
| 0.0 | 83.0 | 0.0 | 80.2 | 0.0 |
| 0.00537 | 82.6 | −0.4 | 80.1 | −0.1 |
| 0.0107 | 83.0 | 0.0 | 80.3 | +0.1 |

The results of the F-1 and F-2 tests are not exactly reproducible; the error is normally ±0.3 octane numbers. Thus, it is readily seen that, when using a fuel under conditions of lean fuel-air mixture, the thallous compounds offer no improvement in octane number.

Monoelectrovalent thallium compounds are surprisingly effective as spark ignition engine fuel additives for increasing the octane numbers (performance numbers) when the fuel containing the monoelectrovalent compound is used in a spark ignition engine operated with a rich fuel-air mixture.

The following Table II presents the performance numbers obtained by adding incremental amounts of thallous naphthenate to an S-reference fuel. As defined hereinabove, S-reference fuel is iso-octane (2,2,4-trimethyl pentane) which has a performance number of 100.

Table II

| Concentration of Monoelectrovalent Thallium Grams/ 100 ml. of fuel | Increase in Performance Number per Increment of Thallium | Performance No. |
| --- | --- | --- |
| 0.0 | 0.0 | 100 |
| 0.025 | 29 | 129 |
| 0.05 | 16 | 145 |

The following Table III shows the effect in performance number obtained by (1) TEL and (2) the combined effect of a monoelectrovalent thallium compound (thallous naphthenate) and tetraethyl lead. The base fuel used was S-reference fuel.

Table III

| Concentration of Monoelectrovalent Thallium (Grams/ 100 ml. of fuel) | Concentration of Lead | | Performance No. |
| --- | --- | --- | --- |
| | Expressed as Grams of Lead per 100 ml. of fuel | Expressed as ml. of TEL per gal. of fuel | |
| 0.0 | 0.0 | 0.0 | 100 |
| 0.0 | 0.0563 | 2.0 | 138 |
| 0.0 | 0.112 | 4.0 | 152 |
| 0.00537 | 0.0563 | 2.0 | 145 |
| 0.0107 | 0.0563 | 2.0 | 155 |
| 0.00577 | 0.112 | 4.0 | 157 |
| 0.0107 | 0.112 | 4.0 | 161 |

As shown in Table IV, the monoelectrovalent thallium, expressed in grams of thallium per 100 ml. of fuel, is more effective than lead from TEL in improving the performance number of a fuel. The data in Table IV shown that 0.0103 gram of thallium (from thallous naphthenate) per 100 ml. of base fuel will raise the performance number of a base fuel from 100 to 126; whereas, 0.0281 gram of lead (from TEL) per 100 ml. of fuel are necessary to raise the performance number of a base fuel from 100 to 126. An additional 0.0069 gram of thallium raised the performance number from 126 to 138, whereas an additional 0.0282 gram of lead was required to raise the performance number from 126 to 138. Thus, it took approximately two times more lead than thallium to raise the performance number of a fuel from 126 to 138. Similarly, in raising the performance number of a fuel from 153 to 161, it took approximately 10 times more lead than thallium. Thus, each incremental amount of monoelectrovalent thallium is approximately 4 to 10 times as effective as the lead from tetraethyl lead. The base fuel was S-reference fuel having a performance number of 100.

*Table IV*

| Grams of Thallium (from thallous naphthenate) per 100 ml. of fuel | Added Increment of Thallium, grams | Corresponding grams of lead (from TEL) per 100 ml. of fuel necessary to give same performance No. | Corresponding Increment of Lead, grams | Performance No. |
|---|---|---|---|---|
| 0.0103 | | 0.0281 | | 126 |
| 0.0172 | 0.0069 | 0.0563 | 0.0282 | 138 |
| 0.0224 | 0.0052 | 0.0844 | 0.0281 | 147 |
| 0.0267 | 0.0043 | 0.112 | 0.0276 | 153 |
| 0.0318 | 0.0051 | 0.169 | 0.057 | 161 |

The following examples further show the effectiveness of organo monoelectrovalent thallium compounds for improving the F-4 rating of S-reference fuel.

EXAMPLE VI

S-reference fuel was blended with the thallous oleate of above Example II so that the thallium content of the blended fuel was 0.01%. The F-4 rating of the blended fuel was .122 performance numbers which was an increase of 22 performance numbers over that of the base fuel.

EXAMPLE VII

S-reference fuel was blended with the thallous cetyl phenate of above Example III so that the blended fuel contained 0.01% thallium. The blended fuel had an F-4 rating of 116, an increase of 16 performance numbers over that of the base fuel.

EXAMPLE VIII

S-reference fuel was blended with the thallous heptadecylate of about Example IV so that the thallium content of the blended fuel was 0.01%. The F-4 rating of the blended fuel was 104 performance numbers, which was an increase of 4 performance numbers over that of the base fuel.

The following Table V further shows the effectiveness of organo monoelectrovalent thallium compounds in improving the F-4 rating of a spark ignition engine fuel. S-reference fuel was the base fuel.

*Table V*

| Thallous Compound | Per Cent Thallium in Blended Fuel | F-4 Rating Performance No. of Blended Fuel | Increase in Performance No. |
|---|---|---|---|
| Thallous Oleate of Example II | 0.01 | 122 | 22 |
| Thallous Cetyl Phenate of Example III | 0.01 | 116 | 16 |
| Thallous Heptadecylate of Example IV | About 0.01 | 104 | 4 |

The above examples and detailed descriptions of the invention set forth the preferred practices of the invention.

Not only does the presence of a monoelectrovalent thallium compound in a spark ignition engine base fuel improve the rich mixture rating of the base fuel, but the cylinder deposits in the spark ignition engine are less when the monoelectrovalent thallium compound is used. The figure illustrates the effectiveness of a monoelectrovalent thallium compound (e. g., thallous naphthenate) in reducing the weight of piston deposits of the spark ignition engine base fuel. The tests were run over a period of 25 hours at a rich mixture fuel-air ratio of 0.10. The figure shows the piston deposit obtained as a function of performance number. The S-reference fuel produced in the engine a piston deposit weighing 0.34 gram. When 2.0 ml. of tetraethyl lead was added to a gallon of S fuel, the blended spark ignition engine fuel was rated at a performance number of 138 and the resulting piston deposit weighed about 2.0 grams. When 6.0 ml. of tetraethyl lead was added per gallon of S fuel the performance number was 161, and the resulting piston deposit weighed 4.0 grams. However, when sufficient thallous naphthenate was added to the S-reference base fuel to produce a spark ignition engine fuel having a performance number of about 168, the weight of the piston deposit was only 0.45 gram, which is only approximately $\frac{1}{10}$ of the deposit produced by the comparative S fuel containing tetraethyl lead in amount sufficient to give a performance number of 161.

We claim:

1. An aviation fuel consisting essentially of a gasoline boiling from about 100° F. to about 400° F. and having a performance number of at least 100 and a small amount of a monoelectrovalent thallium salt of an organic acid sufficient to substantially improve the rich-mixture rating of said fuel but insufficient to substantially increase the lean-mixture rating of the fuel, said small amount being such that the thallium content of the fuel is in the range from about 0.00085 to 0.013 per cent by weight.

2. The improved spark ignition engine fuel of claim 1 in which the organo monoelectrovalent thallium compound is thallous naphthenate.

3. The improved spark ignition engine fuel of claim 1 in which the organo monoelectrovalent thallium compound is thallous oleate.

4. The improved spark ignition engine fuel of claim 1 in which the organo monoelectrovalent thallium compound is thallous heptadecylate.

MAURICE R. BARUSCH.
GEORGE H. DENISON, JR.

REFERENCES CITED

The following references are of record in the file of this patent:

UNITED STATES PATENTS

| Number | Name | Date |
|---|---|---|
| 1,771,169 | Egerton | July 22, 1930 |